Jan. 20, 1970    R. P. ALGER    3,490,279
OIL CONCENTRATION MEASURING APPARATUS AND METHOD
Filed April 28, 1967    2 Sheets-Sheet 1

INVENTOR.
Robert P. Alger
BY John P. Sinnott
ATTORNEY

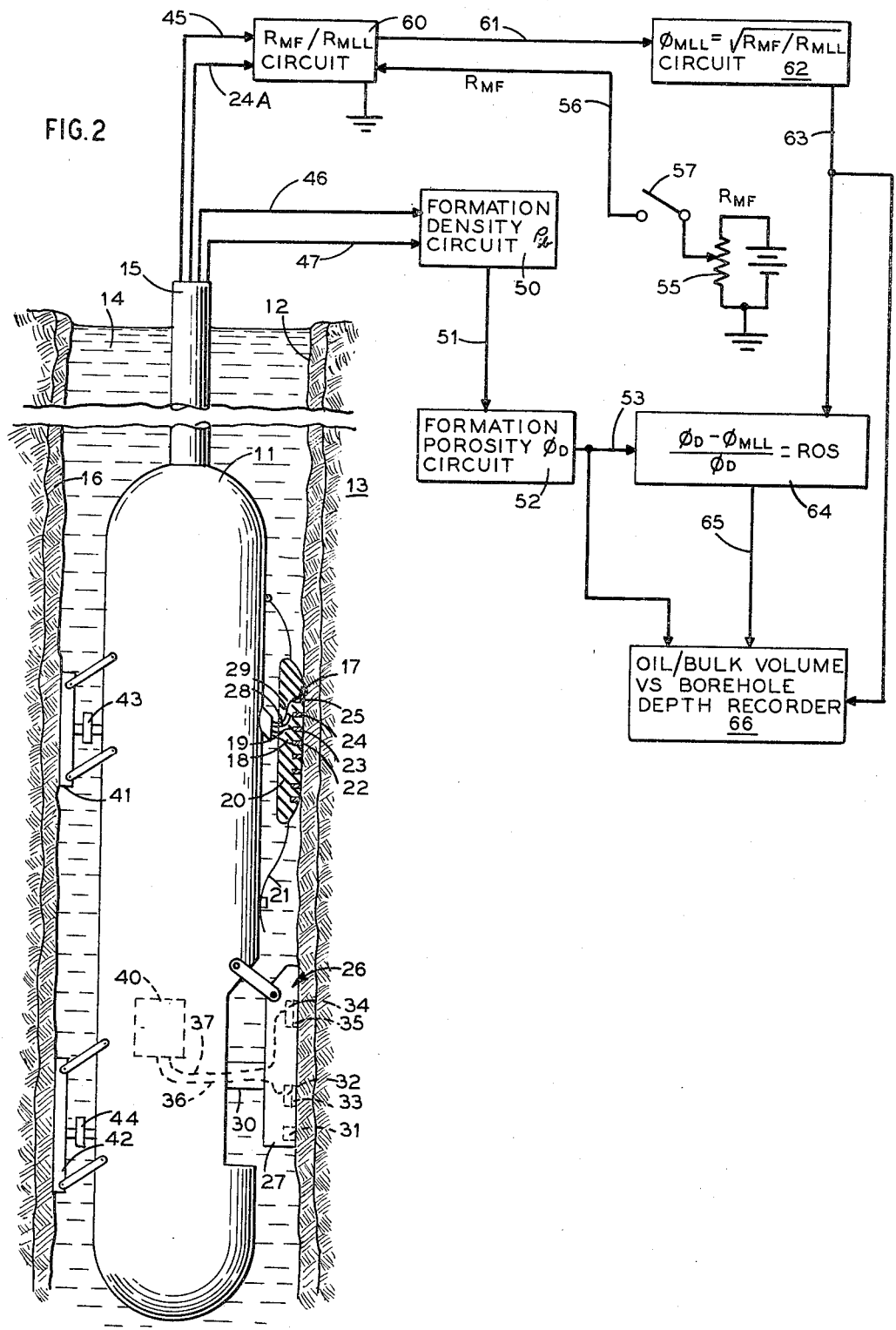

3,490,279
OIL CONCENTRATION MEASURING APPARATUS AND METHOD
Robert P. Alger, Houston, Tex., assignor to Schlumberger Technology Corporation, Houston, Tex., a corporation of Texas
Filed Apr. 28, 1967, Ser. No. 634,530
Int. Cl. E21b *49/00*
U.S. Cl. 73—152          10 Claims

ABSTRACT OF THE DISCLOSURE

A specific embodiment of the invention identifies highly viscous oils in sand formations by contrasting formation porosity derived from a Microlaterolog signal with the formation porosity obtained through a gamma-gamma log. Illustratively, the Microlaterolog porosity is subtracted from the gamma-gamma log porosity. The difference between the two measured porosities indicates the oil concentration within the formation. An automatic computation circuit is shown for calculating this difference.

BACKGROUND OF THE INVENTION

Field of the invention

This invention relates to borehole logging methods and apparatus, and more particularly, to methods and apparatus for measuring the concentration of high viscosity oils in earth formations, and the like.

Description of the prior art

Some earth formations contain extremely viscous, tarlike oil. Oil of this sort has such high internal friction and is so resistant to flow that it cannot be extracted from a formation without resorting to some special production technique. Because this viscous oil is of industrial importance, an inexpensive technique for identifying heavy oil-bearing formations is of substantial commercial interest.

Usually, oil production horizons are identified initially through measurements of earth formation porosity, inasmuch as oil often is found in the formation pores. One suggested technique for measuring porosity makes use of the formation resistivity derived from the Microlaterolog. The Microlaterolog is described in more complete detail in U.S. Patent No. 2,712,629 for "Electrical Logging of Earth Formations Traversed by a Bore Hole," granted to Henri-Georges Doll on July 5, 1955 and assigned to the assignee of the invention described herein. According to this proposal, porosity is measured in terms of the electrical resistivity of the formation flushed by liquids from the borehole drilling mud that seep into the adjacent earth formation. This mud filtrate supplants, or flushes out, the fluids that naturally occur within the earth formation pores. Consequently, a comparison of the mud filtrate resistivity, $R_{mf}$, with the Microlaterolog resistivity, $R_{mll}$, provides an indication of formation porosity. If, however, there is some residual oil that is not flushed out of the pores by the mud filtrate, the Microlaterolog porosity will be lower than true porosity.

Considered from another viewpoint, the resistivity and ionic composition of the naturally occurring water in an earth formation are quite variable. By completely displacing the natural fluids with a liquid of known resistivity, such as the mud filtrate, the resistivity of the flushed zone can provide a basis for a more reliable formation analysis, because one of the uncontrolled or unknown variables in the formation is eliminated from consideration.

Formation porosity and bulk density also may be measured through radioactivity techniques, such as logs of neutron or gamma ray attenuation (gamma logs) in the earth formations surrounding the borehole. Typical proposals of this character are described in more complete detail in John S. Wahl U.S. Patent application Ser. No. 243,300, filed Dec. 10, 1962, and now U.S. Patent No. 3,321,625 for "Compensated Gamma - Gamma Logging Tool;" Harold Sherman and Jay Tittman U.S. Patent application Ser. No. 588,400, filed Oct. 21, 1966 for "Epithermal Neutron Logging;" and Stanley Locke, Harold Sherman and John S. Wahl U.S. Patent application Ser. No. 570,068, filed Aug. 3, 1966 for "Measuring Apparatus and Method," all of which are assigned to the assignee of the invention described herein. These proposed radioactivity techniques, moreover, measure formation porosity quite accurately, and usually are not subject to error caused by residual, unflushed formation fluids within the pores. None of the porosity measuring techniques, however, provide a direct indication of the residual oil concentration within the formation.

Thus, it is an object of the invention to provide an improved technique for indicating directly the residual oil concentration in an earth formation.

SUMMARY

In accordance with the invention, the recognition that some logging techniques measure porosity accurately in spite of residual fluids within the pores, and that the Microlaterolog measures only the porous volume that has been flushed by mud filtrate, enables the concentration of viscous, immovable oil within the pores to be computed directly by subtracting the Microlaterolog porosity from the more-or-less "true" porosity of the formation.

Specifically, the portion of the porous volume flushed by the mud filtrate of known resistivity can be measured accurately through the Microlaterolog. Because viscous oil is not displaced by the mud filtrate, the Microlaterolog will indicate a lower porosity for the formation than the true value, where oil of this sort is present in the formation. The true formation porosity is measured, for example, through a gamma-gamma log, which is not affected by the presence of residual oil within the pores. Consequently, by subtracting the Microlaterolog-derived porosity ($\phi_{mll}$) from the gamma-gamma log porosity ($\phi_d$), a difference is computed that corresponds to the residual oil concentration. If, however, there is substantially no difference between $\phi_d$ and $\phi_{mll}$, the formation contains only water, or fluids that are flushed readily by the mud filtrate.

Thus, assuming that the oil is so viscous that it cannot be displaced or flushed out of the pores by the mud filtrate, it is clear that the difference between the true porosity of the formation and that portion of the porous volume that contains mud filtrate, must hold residual oil.

More particularly, one embodiment of the invention provides a sonde or a well logging tool for transport through the borehole that houses the Microlaterolog and the gamma-gamma log equipment needed to accomplish the aforementioned measurements. A combination tool of this character reduces logging time by more than half the time required to run separate Microlaterolog and gamma ray measurements for the same purpose. Moreover, a combination tool produces a more accurate log because both tools are mounted on the same housing, and therefore engage identical portions of the borehole wall. In contrast, separately run logs might engage different portions for the borehole wall as a result of wall roughness, for example, and thereby produce less accurate results.

In order to eliminate laborious hand computation and produce a more complete log, a further development of the invention provides an automatic computer circuit that performs the calculations required to indicate the concentration of highly viscous oil in the formation under study.

For a better understanding of the present invention, together with other and further objects thereof, reference is had to the following description taken in connection with the accompanying drawings, the scope of the invention being pointed out in the appended claims.

BRIEF DESCRIPTION OF THE DRAWING

FIG. 2 is a schematic drawing in partial section of one embodiment of a logging tool in accordance with the invention, showing the associated electrical circuits in block diagram form.

DESCRIPTION OF THE PREFERRED EMBODIMENTS

Figure 1:
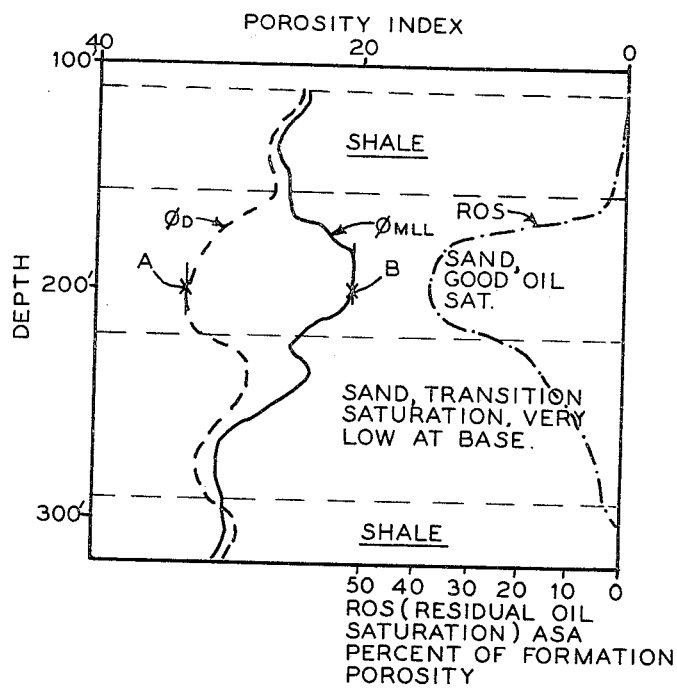
FIG. 1 is a graph of Microlaterolog-derived porosity and gamma-gamma log derived formation porosity in accordance with the invention to provide an indication of the oil concentration within the formation.

For a more complete appreciation of the principles and advantages of the invention, FIG. 1 shows a broken line graph $\phi_d$ of true formation porosity, determined for example by measuring the diffusion and attenuation of gamma radiation within the earth formations under study, as described in more complete detail in the aforementioned Wahl patent application. A solid-line curve $\phi_{mll}$ of Microlaterolog derived formation porosity, also is shown in FIG. 1. As hereinbefore described, the naturally occurring fluids in the zone immediately beyond the borehole wall are supplanted by the drilling mud filtrate. Highly viscous oil, however, is not flushed out of the pores by the liquids from the drilling mud. Accordingly, in these circumstances, formation porosity computed through a measurement of the resistivity of the flushed zone is in error to the extent that the pores contain an unflushed residual oil, thus:

$$\phi_d - \phi_{mll} = \text{Oil per unit bulk volume of formation} \quad (1)$$

A graph of ROS as a function of borehole depth is shown in FIG. 1, where ROS is the residual oil saturation.

In formations that do not contain oil, or contain a relatively inviscid and movable oil, the pores are more thoroughly flushed by the mud filtrate, and Microlaterolog porosity measurements based on flushed zone resistivity are quite accurate. Ideally, in this situation, $$\phi_d - \phi_{mll} = 0 \quad (2)$$

As shown in FIG. 1, a typical log in accordance with the invention contrasts the true porosity curve $\phi_d$ with the porosity of the earth formation shown by the curve $\phi_{mll}$, that was derived from Microlaterolog measurements. The difference between these two curves at a specific borehole depth in the sand formation from about 150′ down to 225′ is, in fact, the percent oil per unit bulk volume of the formation at that depth.

Analytically, this relationship may be determined in sand formations by first computing $\phi_{mll}$:

$$\phi_{mll} = \sqrt{\frac{R_{mf}}{R_{mll}}} \quad (3)$$

where $R_{mf}$ is the resistivity of the mud filtrate, which can be determined by sampling the borehole liquid; and $R_{mll}$ is the apparent value of formation resistance obtained from the Microlaterolog. Thus, in accordance with the invention, $$\frac{\phi_d - \phi_{mll}}{\phi_d} = ROS \quad (4)$$

where $\phi_d$ is the true formation porosity derived from a gamma-gamma log and ROS is residual oil saturation as a percent of pore volume.

In sandstone formations, however, experience indicates that a correction factor ought to be applied to Equation 4. Consequently, $$\frac{\phi_d - .9\phi_{mll}}{\phi_d} = ROS \quad (5)$$

Naturally, experience factors of this sort can be developed for application to other earth formations through observation and measurement.

The foregoing considerations apply to sands which are relatively shale-free. To apply this invention in shalier sands, a controlled value of mud filtrate resistivity must be maintained when drilling the well. This optimum value of $R_{mf}$ is such that Equation 5 equals zero when applied to shale beds.

In order to compute the optimum $R_{mf}$, it is assumed that in a tight, or minimum porosity shale formation, $R_{mll} = R_{sh}$, where $R_{sh}$ is the shale resistivity. Substituting $R_{sh}$ for $R_{mll}$ in Equation 3 provides:

$$\phi_{mll} = \sqrt{\frac{R_{mf}}{R_{sh}}} \quad (6)$$

Because ROS in a minimum porosity shale formation is equal to zero, Equation 5 in this instance reduces to $$\phi_d - .9\phi_{ml} = 0 \quad (7)$$

Substituting Equation 6 for $\phi_{mll}$ in Equation 7 leaves $$\phi_d = .9\sqrt{\frac{R_{mf}}{R_{sh}}} \quad (8)$$

Since $\phi_d$ is measured and $R_{sh}$ is known for a specific formation through drill cutting analysis or the like, the optimum value of $R_{mf}$ will be found by rearranging Equation 8:

$$R_{mf} = \frac{\phi_d^2}{.81} R_{sh} \quad (9)$$

The mud constituents then are controlled during drilling to provide this optimum value of $R_{mf}$ for shale-sand mixtures in order to overcome the influence of the shale on subsequent logging measurements. Consequently, an accurate value of $\phi_{mll}$ in shaly sands can be computed and contrasted with $\phi_d$ to measure the residual oil saturation in conformity with the principles of the invention.

As shown in FIG. 1, at a borehole depth of 200′, the true formation porosity at point A is about 33%. The Microlaterolog porosity $\phi_{mll}$ at point B for the same borehole depth is about 20%. By subtracting $\phi_{mll}$ from $\phi_d$ in accordance with Equation 1, it is determined that the viscous oil per unit bulk volume in the formation at the 200′ borehole depth is 13%. Below about 300′, a shale formation is encountered. At a borehole depth of 310′, the difference between $\phi_d$ and $\phi_{mll}$ is zero. This situation shows that only water is present in the shale formation, if the optimum mud filtrate resistivity was used during drilling.

An illustrative embodiment of a practical apparatus for practicing the invention is shown in FIG. 2.

The tool comprises a fluid-tight pressure resistant housing 11 adapted to pass through a borehole 12 that traverses, for example, a sand formation 13. The borehole 12 is filled with a water-base drilling mud 14 as shown. The housing 11 is suspended in the borehole 12 by an armored cable 15 which contains a group of insulated conductors for transmitting signals to the earth's surface. A winch (not shown) located at the surface of the earth is used to lower and raise the housing in the borehole in the customary manner to traverse the earth formations 13.

The borehole 12 may be lined with a mudcake 16 which usually forms in uncased boreholes when the liquids in the drilling mud invade or seep into the earth formations 13 surrounding the borehole 12 and deposit a residue of solid matter on the borehole walls.

Liquids seeping into the formation 13 from the drilling mud 14 produce two zones of fluid contamination within the earth formations 13 adjacent to the wall of the borehole 12. In the flushed zone, the liquids from the drilling mud 14 have completely displaced all of the movable, naturally occurring fluid in the earth formation pores. The second zone, which includes the flushed zone, extends more deeply into the formation 13 and frequently is called the zone of invasion. In this radially deeper penetration of the formation 13, liquids from the drilling mud 14 in the zone of invasion displace only a part of the movable fluids contained within the earth formation pores.

The Microlaterolog, which is described in more complete detail in the aforementioned Doll patent, measures the resistivity of the flushed zone by electrically focussing a current from the electrodes 17 on the pad of insulating material 20 (shown in section in FIG. 2) which is urged against the mudcake 16 by a bowspring 21 or the like. The electrodes 17 comprise a central electrode 22 embedded in the insulating pad 20. The electrode is circumscribed by a group of three similarly embedded concentric conducting rings 23, 24 and 25. Voltages are applied to the electrode 22 and to the rings 23, 24 and 25 through conductors 18, 19, 28 and 29, respectively. These electrodes focus the electrical field established by the central electrode 22 and cause the current emitted from this electrode to flow substantially perpendicularly into the wall of the borehole 12. Inasmuch as the mudcake 16 has a low resistivity, the current-voltage relationship produced by the directional current from the electrode 22 is largely a measure of the resistivity of the flushed zone immediately in front of the electrode 22. A signal corresponding to the resistivity of the formation measured by the Microlaterolog, $R_{mll}$, is sent to the earth's surface through a conductor 24A in the cable 15.

The true porosity of the earth formation, $\phi_d$, illustratively is measured by means of a gamma-gamma log 26 mounted in a pad 27 that is urged against the wall of the borehole 12. The gamma-gamma log 26 is the mudcake compensated type, described in more complete detail in the aforementioned Wahl patent application. As shown in FIG. 2, the gamma-gamma log 26 comprises a cesium-137 ($Cs^{137}$) gamma radiation source 31 for irradiating the formation 13. A first gamma ray detector 32 is mounted in the pad 27 adjacent to the side that abuts the formation 13. The detector 32 is longitudinally spaced from and in vertical alignment with the source 31. Shielding (not shown) is interposed between the source 31 and the detector 32 to protect the detector from direct source radiation and to limit the gamma rays registered by the detector 32 to those gamma rays that have been scattered by the electron structure of the earth formation 13 back toward the pad 27. A filter 33 is interposed between the detector 32 and the mudcake to absorb gamma rays of less than about 50 kev. energy in order to limit the energy range of the detected gamma radiation to those energies that characterize the density of the formation 13.

A second gamma ray detector 34, spaced in general alignment with, but more distantly from the source 31 also is equipped with a 50 kev. filter 35 and is shielded (not shown) from direct source radiation.

The detectors 32 and 34 measure the attenuation of the emitted gamma radiation in the earth formation 13 and the mudcake 16. Signals characterizing this attenuation, applied by the detectors 32 and 34 to conductors 36 and 37, respectively, are processed in amplification and scaling circuit 40 for transmission through a conductor 47 in the armored cable 15 to the earth's surface.

To compensate, at least in part, for the influence of the mudcake 16 and other borehole effects such as caving, borehole diameter variations and the like, decentralizing pads 41 and 42 are pivotally attached to the housing 11.

The pads 41 and 42 are biased to provide a radially directed force which presses the Microlaterolog insulating pad 20 and the gamma-gamma log pad 27 against adjacent portions of the wall of the borehole 12. The two pads 41 and 42 enable the instrument-bearing pads 20 and 27 to follow borehole wall undulations more exactly.

Borehole calipers 43 and 44 also are combined with the respective decentralizing pads 41 and 42. The calipers 43 and 44 transmit signals to the earth's surface through conductors 45 and 46, respectively, that correspond to variations in the borehole diameter as a result of changes in mudcake thickness and the like. Typically, the calipers 43 and 44 may comprise a pair of potentiometers that change in electrical resistance with each undulation in the mudcake 16.

Because gamma ray attenuation primarily is a measure of electron density, the signals from the detectors 32 and 34 must be manipulated to produce a signal that is related to the porosity of the earth formation 13. Accordingly, the downhole circuit 40 first transmits signals through the conductor 47 to a formation density ($\rho_b$) circuit 50 on the earth's surface. The formation density circuit 50 combines the gamma ray attenuation measurements obtained from the detectors 32 and 34 with the mudcake thickness signal in the conductor 46 to produce an output signal in conductor 51 that corresponds to the density of the earth formation 13. A circuit of this sort can be a function former circuit, in which the signals in the conductors 46 and 47 are applied to an operational amplifier. The amplifier responds to input and feedback resistance to produce an output signal that corresponds to the formation density.

The density signal in the conductor 51 then is sent to a formation porosity circuit 52, which may be a function former circuit that converts formation density, $\rho_b$, to porosity, $\phi_d$, in accordance with the equation:

$$\phi_d = \frac{\rho_g - \rho_b}{\rho_g - \rho_f} \quad (8)$$

where $\rho_g$ is the grain density of the formation matrix, usually a constant for each specific formation mineral composition; $\rho_b$ is the bulk density of the formation as determined through the gamma ray measurements hereinbefore described; and $\rho_f$ is the density of the fluid occupying the pore space within the formation 13, a constant that usually is given a value of 1 gm./cc. Accordingly, the formation porosity circuit 52 applies a signal to conductor 53 that is related to the gamma ray derived formation porosity, $\phi_d$.

$\phi_{mll}$ is computed in circuits 60 and 62 in accordance with Equation 3 by combining a signal that corresponds to the resistivity measured by the Microlaterolog, $R_{mll}$, in the conductor 24A with the mud filtrate resistivity signal, $R_{mf}$, and, optionally, the borehole caliper signal in the conductor 45. The caliper signal, if used, provides a basis for adjusting the output from the circuit 60 in response to the thickness of the mudcake 16, the thicker mudcake often being indicative of a more porous formation for a given resistivity signal.

The mud filtrate resistivity signal is taken, in one embodiment of the invention, from a tap on a potentiometer 55 which may be connected selectively through a switch 57 and a conductor 56 to the circuit 60. By appropriately adjusting the output from the potentiometer 55, a signal is applied to the circuit 60 in accordance with a measured value of mud filtrate resistivity. In response to these input signals on the conductors 24A, 45 and 56, the circuit 60 transmits an output signal through a conductor 61 that corresponds to the expression:

$$\frac{R_{mf}}{R_{mll}} \quad (10)$$

The signal in the conductor 61 activates the circuit 62 that takes the square root of the ratio in Expression 10.

The output from the square root circuit 62 is the solution to Equation 3 and represents the Microlaterolog derived porosity, $\phi_{mll}$, for the said formation 13 which is applied to an output conductor 63. A function former circuit 64 contrasts $\phi_d$ in the conductor 53 and $\phi_{mll}$ in the conductor 63 to provide a signal in output conductor 65 that corresponds to the residual oil saturation:

$$\frac{\phi_d - \phi_{mll}}{\phi_d} = ROS \qquad (11)$$

The residual oil saturation signal in the conductor 65 chart of the oil concentration signal as a function of is sent to a recorder 66 which produces a graph or strip chart of the oil concentration signal as a function of borehole depth. For record completeness, traces of true formation porosity, $\phi_d$, and flushed zone resistivity porosity, $\phi_{mll}$, also may be applied to the recorder 66 by the conductors 53 and 63, respectively.

If the formation 13 is a shale-sand mixture, and the mud filtrate is controlled to provide the optimum resistivity computed in accordance with Equation 9, the tap on the potentiometer 55 is adjusted to send a signal through the conductor 56 to the circuit 60 that corresponds to this special value. The circuit 64 also is adjusted to provide an output signal on the conductor 65 that corresponds to Equation 5. Alternatively, the chart from the recorder can be provided with two separate scales that indicate residual oil saturation in sand or sandstone-shale formations, and thereby avoid the requirement to adjust the response of the circuit 64 to accommodate the .9 correction factor to $\phi_{mll}$.

Clearly, it is desirable, although it is not necessary in order to practice the invention, to log the borehole for $R_{mll}$ and $\rho_b$ with a single device such as the tool 11 shown in FIG. 2. Separate logging runs for $\rho_b$ and $R_{mll}$ can be made, and the data from each run can be recordeded and stored on magnetic tape. Subsequently, the tape can be played back to a computer that will manipulate the data as hereinbefore described.

While there have been described what is at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A borehole logging tool for measuring the viscous oil concentration in an earth formation comprising a pressure-tight housing, a plurality of electrodes for producing a signal that corresponds to at least the apparent porosity of the formation adjacent to the borehole, a pad connected to said housing for urging said plurality of electrodes against the borehole wall, a source of gamma radiation, gamma ray detector means spaced from said source to produce a signal that corresponds to the density of the earth formation adjacent to the borehole, a pad enclosing said source and said gamma ray detector means, means for urging said pad against the borehole wall, and means for processing said signals for a correlated recording thereof from which indications of the viscous oil concentration in the earth formation can be derived.

2. A borehole logging system for measuring the viscous oil in an earth formation that has been flushed at least in part by fluids from the borehole comprising means for measuring the porosity of the earth formation, means for measuring the apparent porosity of the portion of the earth formation flushed by at least some of the borehole fluid, and computer means responsive to said porosity and said flushed porosity measurements for combining said earth formation porosity and said flushed portion measurements to produce an indication of the viscous oil in earth formation pores.

3. A logging system according to claim 2 wherein said means for measuring the earth formation porosity comprises a source of radiation and at least one radiation detector spaced therefrom for measuring the attenuation of said radiation within the earth formation.

4. A logging system according to claim 2 wherein said flushed portion measuring means comprises a plurality of electrodes adjacent to the borehole wall for measuring the electrical characteristics of the flushed formation.

5. A logging system according to claim 4 wherein said means for measuring the porosity of the earth formation comprises a source of gamma rays, a first detector spaced from said gamma ray source, a second detector spaced from said gamma ray source a distance greater than said first detector, a pad enclosing said source and said detectors, and means for urging said pad against the bore hole wall.

6. A logging system according to claim 5 wherein said computer means comprises a circuit for converting signals from said gamma ray detectors into a signal that is related to the earth formation porosity, and further circuit means for converting a signal from said electrodes into a signal that corresponds to that portion of the earth formation porosity that is flushed with the borehole fluid.

7. Apparatus for measuring the oil within a porous earth formation that has been flushed at least in part through fluids from the borehole comprising means for providing a signal that corresponds to the porosity of the earth formation, a further means for providing a signal that is related to the resistivity of the earth formation flushed by the borehole fluid, circuit means responsive to said resistivity signal for producing a signal that is related to the volume of the earth formation flushed by the fluid, and further circuit means for combining said porosity and said volume signals to indicate formation oil saturation in said flushed volume.

8. A method for measuring the residual oil in an earth formation that has been flushed at least in part by drilling fluids from the borehole comprising the steps of measuring the porosity of the earth formation, measuring the apparent porosity of the portion of the earth formation flushed by the drilling fluid, and combining said porosity with said flushed portion measurements in order to change said measurements into an indication of the residual oil in said flushed portion.

9. A method for measuring the oil in the earth formation according to claim 8 wherein said step of measuring the earth formation porosity comprises the steps of irradiating the earth formation, measuring the attenuation of said radiation, and combining said radiation attenuation measurements to produce an indication of the porosity of the earth formation.

10. A method for measuring the oil in an earth formation according to claim 8 wherein the step of measuring the flushed portion of the porosity comprises measuring the resistivity of the flushed portion of the earth formation, and changing the flushed portion resistivity measurement into an indication of the apparent earth formation porosity.

No references cited.

RICHARD C. QUEISSER, Primary Examiner

J. W. MYRACLE, Assistant Examiner

U.S. Cl. X.R.

250—83.6